*(12)* United States Patent
Nose et al.

(10) Patent No.: US 9,745,404 B2
(45) Date of Patent: Aug. 29, 2017

(54) RESIN MOLDED ARTICLE FOR AUTOMOBILE INTERIOR MATERIAL

(71) Applicants: SANYO CHEMICAL INDUSTRIES, LTD., Kyoto-shi, Kyoto (JP); TOYOTA JIDOSHA KABUSHIKI KAISHA, Toyota-shi, Aichi (JP)

(72) Inventors: Kenta Nose, Kyoto (JP); Koichi Saito, Kyoto (JP); Osami Yamada, Kyoto (JP); Hiroyuki Ishii, Kyoto (JP); Daisuke Taniguchi, Toyota (JP)

(73) Assignees: SANYO CHEMICAL INDUSTRIES, LTD., Kyoto-shi, Kyoto (JP); TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 15/306,253

(22) PCT Filed: Apr. 23, 2015

(86) PCT No.: PCT/JP2015/062336
§ 371 (c)(1),
(2) Date: Oct. 24, 2016

(87) PCT Pub. No.: WO2015/163392
PCT Pub. Date: Oct. 29, 2015

(65) Prior Publication Data
US 2017/0044300 A1  Feb. 16, 2017

(30) Foreign Application Priority Data

Apr. 25, 2014  (JP) ................. 2014-090899

(51) Int. Cl.

| | |
|---|---|
| *C08G 18/42* | (2006.01) |
| *C08G 18/12* | (2006.01) |
| *C08G 18/30* | (2006.01) |
| *C08G 18/38* | (2006.01) |
| *C08G 18/66* | (2006.01) |
| *C08G 18/73* | (2006.01) |
| *B29C 41/00* | (2006.01) |
| *B29C 41/18* | (2006.01) |
| *B29C 41/36* | (2006.01) |
| *C08G 18/28* | (2006.01) |
| *C08G 18/32* | (2006.01) |
| *B29K 75/00* | (2006.01) |
| *B29K 105/00* | (2006.01) |
| *B29L 31/30* | (2006.01) |

(52) U.S. Cl.
CPC .......... *C08G 18/4211* (2013.01); *B29C 41/36* (2013.01); *C08G 18/12* (2013.01); *C08G 18/2825* (2013.01); *C08G 18/30* (2013.01); *C08G 18/3206* (2013.01); *C08G 18/3819* (2013.01); *C08G 18/4202* (2013.01); *C08G 18/4216* (2013.01); *C08G 18/4238* (2013.01); *C08G 18/664* (2013.01); *C08G 18/6633* (2013.01); *C08G 18/73* (2013.01); *B29C 41/003* (2013.01); *B29C 41/18* (2013.01); *B29K 2075/00* (2013.01); *B29K 2105/0094* (2013.01); *B29K 2105/251* (2013.01); *B29K 2995/0077* (2013.01); *B29K 2995/0088* (2013.01); *B29L 2031/30* (2013.01); *C08G 2140/00* (2013.01)

(58) Field of Classification Search
None
See application file for complete search history.

(56) References Cited

U.S. PATENT DOCUMENTS

| | | | |
|---|---|---|---|
| 2006/0045996 A1 | 3/2006 | Fujibayashi et al. | |
| 2009/0256276 A1* | 10/2009 | Humphrey, Jr. ...... | B29C 41/003 264/45.4 |
| 2009/0264614 A1* | 10/2009 | Hayashi ............. | C08G 18/0871 528/85 |

(Continued)

FOREIGN PATENT DOCUMENTS

| | | |
|---|---|---|
| JP | 2003-080539 A | 3/2003 |
| JP | 2003-300428 A | 10/2003 |

(Continued)

OTHER PUBLICATIONS

International Search Report for PCT/JP2015/062336 dated Jul. 14, 2015 [PCT/ISA/210].

(Continued)

*Primary Examiner* — Christopher M Rodd
(74) *Attorney, Agent, or Firm* — Sughrue Mion, PLLC

(57) ABSTRACT

Provided is a resin molded article for an automobile interior material, the resin molded article achieving both resin strength permitting formation of a thin film, and crease resistance. This molded article is to be used in an automobile interior material, the resin molded article being obtained by slush-molding a powdered thermoplastic urethane urea resin composition (P) that satisfies (1)-(5) below, said resin composition (P) containing an additive and a thermoplastic urethane urea resin (U) obtained by reacting a high-molecular diol (a), a linear alkane diol (b), a monool (c), a diamine (d), and an organic diisocyanate (e):

(1) (a) contains a specific polyester diol;
(2) the weight of (b) is within a specific range relative to the total weight of (a)-(e);
(3) the tensile strength of a film comprising (P) is 8.0 MPa or higher;
(4) the storage modulus of (P) at 130° C. is 0.1-5.0 MPa;
(5) the ratio of the storage modulus of (P) at 50° C. to the storage modulus at 23° C. by a specific measurement method is 50% or higher.

5 Claims, No Drawings

(56) References Cited

U.S. PATENT DOCUMENTS

2013/0261240 A1* 10/2013 Yasuhara ............... C08L 33/12
                                                        524/292
2015/0086770 A1    3/2015 Tsudo et al.

FOREIGN PATENT DOCUMENTS

| JP | 2007-119546 A | 5/2007 |
| JP | 2007-204693 A | 8/2007 |
| JP | 2011-140644 A | 7/2011 |
| JP | 2013-241574 A | 12/2013 |
| WO | 2011/070751 A1 | 6/2011 |
| WO | 2011/070784 A1 | 6/2011 |
| WO | 2013/018747 A1 | 2/2013 |

OTHER PUBLICATIONS

Written Opinion for PCT/JP2015/062336 dated Jul. 14, 2015 [PCT/ISA/237].
Office Action dated Apr. 5, 2016 from the Japanese Patent Office in counterpart Japanese Application No. 2014-090899.

* cited by examiner

RESIN MOLDED ARTICLE FOR AUTOMOBILE INTERIOR MATERIAL

CROSS REFERENCE TO RELATED APPLICATIONS

This application is a National Stage of International Application No. PCT/JP2015/062336 filed Apr. 23, 2015, claiming priority based on Japanese Patent Application No. 2014-090899 filed Apr. 25, 2014, the contents of all of which are incorporated herein by reference in their entirety.

TECHNICAL FIELD

The present invention relates to a resin molded article for automobile interior materials obtained by slush molding a powdery thermoplastic urethane urea resin composition.

BACKGROUND ART

The slush molding method has been used widely for applications typified by automobile interior materials, adhesives for interlining, etc. because of its advantages such as being capable of easily molding products with complicated shapes (undercut, deep drawing, etc.), being capable of making uniform the thickness of products, and being capable of affording high yield rate of materials.

While a soft polyvinyl chloride powder has mainly been used as a slush molding material, polyurethane resins have also been used in recent years (see, for example, Patent Document 1).

However, a skin for an instrument panel, which is an automobile interior material, is demanded to be reduced in its thickness from a cost reduction point of view, and in reducing thickness, it is necessary to satisfy higher resin strength as compared with ordinary skin strength. However, a skin being high in resin strength is low in elasticity development rate of resin during cooling after thermoforming and, therefore, at the time of removal of the skin from a mold or real-stitching aiming at high design quality, there arises a problem that the skin is deformed and wrinkles are formed. Moreover, a resin material being low in resin strength cannot be formed into a thin film because tear or the like of a skin occurs and the heat resistance of the material deteriorates during the formation of a thin film.

PRIOR ART DOCUMENT

Patent Document

Patent Document 1: JP-A-2007-204693

SUMMARY OF THE INVENTION

Problem to be Solved by the Invention

The problem to be solved by the present invention is to provide a resin molded article for automobile interior materials, the resin molded materials being capable of achieving both resin strength high enough for formation of a thin film and crease resistance.

Solutions to the Problem

As a result of earnest study to solve the problem, the present inventors have reached the present invention. That is, the present invention is a resin molded article for automobile interior materials, the resin molded article being obtained by slush molding a powdery thermoplastic urethane urea resin composition (P) that satisfies the following (1) through (5), said resin composition containing an additive and a thermoplastic urethane urea resin (U) obtained by reacting a polymeric diol having a number average molecular weight of 500 to 5,000 (a), a linear alkane diol having 4 to 6 carbon atoms (b), a monool (c), a diamine having 6 to 10 carbon atoms (d), and an organic diisocyanate (e):

(1) the polymeric diol (a) comprises a polyester diol (a1) obtained by reacting an aromatic dicarboxylic acid having 8 to 12 carbon atoms (f1) with ethylene glycol and a polyester diol (a2) obtained by reacting an aliphatic dicarboxylic acid having 4 to 15 carbon atoms (f2) with an aliphatic diol having 2 to 6 carbon atoms (g);
(2) the ratio of the weight of the (b) to the total weight of the (a), the (b), the (c), the (d) and the (e) is 0.4 to 1.0% by weight;
(3) the tensile strength at 25° C. of a formed film of the (P) is 8.0 MPa or more;
(4) the storage modulus $G'_{130}$ of the (P) measured after the (P) being left at 130° C. for 1 hour when the (P) is cooled to 130° C. at a cooling rate of 35° C./minute after being melted at 200° C. is 0.1 to 5.0 MPa;
(5) the ratio of storage modulus G' represented by formula (1) is 50% or more;

$$\text{the ratio of storage modulus } G' = G'_{50} \div G'_{23} \times 100 \quad (1)$$

wherein $G'_{50}$ is the storage modulus G' of the (P) measured at 50° C. when the (P) is melted at 200° C. and then is cooled to 40° C. at a cooling rate of 80° C./minute, and $G'_{23}$ is the storage modulus G' of the (P) measured after the (P) being left at 23° C. for 1 hour when the (p) is cooled to 23° C. at a cooling rate of 35° C./minute after being melted at 200° C.

Advantages of the Invention

The resin molded article for automobile interior materials of the present invention has high resin strength and is superior in crease resistance.

MODE FOR CARRYING OUT THE INVENTION

The resin molded article for automobile interior materials of the present invention is obtained by slush molding the powdery thermoplastic urethane urea resin composition (P) comprising the additive and the thermoplastic urethane urea resin (U) obtained by reacting the polymeric diol having a number average molecular weight (hereinafter abbreviated to Mn) of 500 to 5,000 (a), the linear alkane diol having 4 to 6 carbon atoms (b), the monool (c), the diamine having 6 to 10 carbon atoms (d), and the organic diisocyanate (e).

The Mn of the diol in the present invention is a value calculated from a hydroxyl number of the diol measured in accordance with JIS K 1557-1 (Plastics-Polyols for use in the production of polyurethane—Part 1: Determination of hydroxyl number).

The polymeric diol (a) having an Mn of 500 to 5,000 to be used for the thermoplastic urethane urea resin (U) comprises the polyester diol (a1) obtained by reacting the aromatic dicarboxylic acid having 8 to 12 carbon atoms (f1) with ethylene glycol and the polyester diol (a2) obtained by reacting the aliphatic dicarboxylic acid having 4 to 15 carbon atoms (f2) with the aliphatic diol having 2 to 6 carbon atoms (g).

Examples of the aromatic dicarboxylic acid having 8 to 12 carbon atoms (f1) include terephthalic acid, isophthalic acid, and orthophthalic acid.

Examples of the aliphatic dicarboxylic acid having 4 to 15 carbon atoms (f2) include succinic acid, adipic acid, sebacic acid, glutaric acid, azelaic acid, maleic acid, and fumaric acid.

The Mn of the polyester diol (a1) is usually 500 to 5,000, and from the perspectives of tensile strength and elongation, it is more preferably 1,500 to 3,000.

Examples of the aliphatic diol having 2 to 6 carbon atoms (g) include ethylene glycol, 1,3-propanediol, 1,4-butanediol, 1,5-pentanediol, and 1,6-hexanediol, and from the perspective of low temperature characteristics, such as embrittlement, 1,4-butanediol is preferred.

The Mn of the polyester diol (a2) is usually 500 to 5,000, and from the perspective of low temperature characteristics, such as embrittlement, it is more preferably 800 to 1,500.

The weight ratio of the polyester diol (a1) to the polyester diol (a2) [(a1):(a2)] is preferably from 5:95 to 30:70 from the perspective of low temperature characteristics, such as embrittlement.

The polymeric diol (a) may further comprise a polyester diol (a3), a polyether diol (a4), a polyether ester diol (a5), etc. other than (a1) and (a2). The (a) may be used singly or two or more of the same may be used in combination.

Examples of the polyester diol (a3) other than (a1) and (a2) include (1) products of polycondensation of a low molecular weight diol resulting from excluding ethylene glycol from a low molecular weight diol having an Mn of less than 500 (h) with an aromatic dicarboxylic acid having 8 to 12 carbon atoms (f1) or its ester-formable derivative [acid anhydride, lower alkyl (having 1 to 4 carbon atoms) ester, acid halide, etc.]; (2) products of polycondensation of a low molecular weight diol resulting from excluding an aliphatic diol having 2 to 6 carbon atoms (g) from a low molecular weight diol having an Mn of less than 500 (h) with an aliphatic dicarboxylic acid having 4 to 15 carbon atoms (f2) or its ester-formable derivative [acid anhydride, lower alkyl (having 1 to 4 carbon atoms) ester, acid halide, etc.]; (3) products produced by ring-opening polymerizing a lactone using a low molecular weight diol having an Mn of less than 500 (h) as an initiator; and mixtures of two or more thereof.

Examples of the low molecular weight diol having an Mn of less than 500 (h) include aliphatic diols having 2 to 8 carbon atoms [linear diols (ethylene glycol, diethylene glycol, 1,3-propanediol, 1,4-butanediol, 1,5-pentanediol, 1,6-hexanediol, etc.), branched diols (propylene glycol, neopentyl glycol, 3-methyl-1,5-pentanediol, 2,2-diethyl-1,3-propanediol, and 1,2-, 1,3-, or 2,3-butanediol, etc.), etc.]; diols having a cyclic group [alicyclic group-containing diols having 6 to 15 carbon atoms {1,4-bis(hydroxymethyl)cyclohexane, hydrogenated bisphenol A, etc.}, aromatic ring-containing diols having 8 to 20 carbon atoms (m- or p-xylylene glycol, etc.), oxyalkylene ether diols of monocyclic phenols (catechol, hydroquinone, etc.), oxyalkylene ether diols of bisphenols (bisphenol A, bisphenol S, bisphenol F, etc.), oxyalkylene ether diols of polynuclear phenols (dihydroxynaphthalene, etc.), and bis(2-hydroxyethyl)terephtalate, etc.]; AO adducts thereof (molecular weight: less than 500) and mixtures of two or more thereof. Of such low molecular weight diols, aliphatic diols and alicyclic group-containing diols are preferred.

Examples of the lactone monomer include γ-butyrolactone, ε-caprolactone, γ-valerolactone, and mixtures of two or more of thereof.

Specific examples of the polyester diol (a3) other than (a1) and (a2) include polycaprolactone diol, polyvalerolactone diol, and polyhexamethylenecarbonate diol.

Examples of the polyether diol (a4) include AO adducts of the low molecular weight diol (h), and of these, AO adducts of bisphenols are preferred, and ethylene oxide adducts of bisphenols are more preferred.

Examples of the polyether ester diol (a5) include products each obtained by using the polyether diol (a4) instead of the low molecular weight diol that is a raw material in the polyester diols (a1) through (a3), for example, products each obtained by condensation polymerization of one or more of the polyether diols (a4), and one or more of the aromatic dicarboxylic acid (f1) or aliphatic dicarboxylic acid (f2) or the ester-formable derivatives thereof disclosed as examples of the raw material of the polyester diols.

From the perspectives of tensile strength and elongation, the Mn of the polyester diol (a3), the polyether diol (a4), and the polyether ester diol (a5) is preferably 500 to 5,000, more preferably 1,500 to 3,000.

Examples of the linear alkane diol having 4 to 6 carbon atoms (b) as used in the present invention include 1,4-butanediol, 1,5-pentanediol, and 1,6-hexanediol, and preferred from the perspectives of crease resistance and tensile strength are 1,4-butanediol and 1,6-hexanediol. The (b) may be used singly or two or more of them may be used in combination.

Examples of the monool (c) include aliphatic monools having 1 to 8 carbon atoms [linear monools (methanol, ethanol, propanol, butanol, pentanol, hexanol, octanol, etc.), and branched monools (isopropyl alcohol, neopentyl alcohol, 3-methyl-pentanol, 2-ethylhexanol), etc.]; cyclic group containing monools having 6 to 10 carbon atoms [alicyclic group-containing monools (cyclohexanol, etc.) and aromatic ring-containing monools having 7 to 12 carbon atoms (benzyl alcohol, naphthylethanol, etc.), etc.]; and mixtures of two or more thereof. Polymeric monools, such as polyester monools, polyether monools, and polyether ester monools, can also be used as the monool (c). Of these, preferred are aliphatic monools having 6 to 10 carbon atoms and aromatic ring-containing monools having 7 to 12 carbon atoms.

Examples of the diamine having 6 to 10 carbon atoms (d) include alicyclic diamines having 6 to 10 carbon atoms (4,4'-diamino-3,3'-dimethyldicyclohexylmethane, 4,4'-diaminodicyclohexylmethane, diaminocyclohexane, isophoronediamine, etc.); aliphatic diamines having 6 to 10 carbon atoms (hexamethylenediamine, etc.); araliphatic diamines having 8 to 10 carbon atoms (xylylenediamine, etc.), and mixtures of two or more thereof. Of these, alicyclic diamines and aliphatic diamines are preferable, and isophoronediamine and hexamethylenediamine are more preferable.

Examples of the organic diisocyanate (e) include the following.

(i) Aliphatic diisocyanates having 2 to 18 carbon atoms (excluding carbon atoms in the NCO groups; the same applies hereinafter) [ethylene diisocyanate, tetramethylene diisocyanate, hexamethylene diisocyanate (hereinafter abbreviated to HDI), dodecamethylene diisocyanate, 2,2,4-trimethylhexamethylene diisocyanate, lysine diisocyanate, 2,6-diisocyanato methylcaproate, bis(2-isocyanatoethyl) fumarate, bis(2-isocyanatoethyl) carbonate, 2-isocyanatoethyl-2,6-diisocyanato hexanoate, etc.];

(ii) alicyclic diisocyanates having 4 to 15 carbon atoms [isophorone diisocyanate (hereinafter abbreviated to IPDI), dicyclohexylmethane-4,4'-diisocyanate (hereinafter abbreviated to hydrogenated MDI), cyclohexylene diisocyanate, methylcyclohexylene diisocyanate, bis(2-isocyanatoethyl)-4-cyclohexene, etc.];
(iii) aralipathic diisocyanates having 8 to 15 carbon atoms [m- or p-xylylene diisocyanate, $\alpha,\alpha,\alpha',\alpha'$-tetramethylxylylene diisocyanate, etc.];
(iv) aromatic diisocyanate [1,3- or 1,4-phenylene diisocyanate, 2,4- or 2,6-tolylene diisocyanate (hereinafter abbreviated to TDI), crude TDI, 2,4'- or 4,4'-diphenylmethane diisocyanate (hereinafter abbreviated to MDI), 4,4'-diisocyanatobiphenyl, 3,3'-dimethyl-4,4'-diisocyanatobiphenyl, 3,3'-dimethyl-4,4'-diisocyanatodiphenylmethane, crude MDI, 1,5-naphthylenediisocyanate, etc.];
(v) modified forms of these diisocyanates (modified diisocyanates having a carbodiimide group, a uretdione group, a uretimine group, a urea group, etc.).

Of these, aliphatic diisocyanates and alicyclic diisocyanates are preferred from the perspective of weather resistance, and HDI, IPDI and hydrogenated MDI are more preferred.

The (d) may be used singly or two or more of the same may be used in combination.

The ratio of the weight of the (b) to the total weight of the (a), the (b), the (c), the (d) and the (e) is usually 0.4 to 1.0% by weight.

The melt viscosity at 190° C. of the thermoplastic urethane urea resin (U) is preferably 300 to 1,000 Pa·s, more preferably 300 to 700 Pa·s from the perspective of the meltability of the thermoplastic urethane urea resin (U). The melt viscosity as used in the present invention is measured by the method described in Examples.

The volume average particle diameter of the thermoplastic urethane urea resin (U) in the present invention, is preferably 10 to 500 μm, more preferably 70 to 300 μm. The thermoplastic urethane urea resin (U) may be either in a spherical shape or in a non-spherical shape. The volume average particle diameter as used in the present invention is measured by the method described in Examples.

The storage modulus at 130° C., $G'_{130}$, of the thermoplastic urethane urea resin (U) is preferably 0.2 to 10 MPa, more preferably 0.5 to 2 MPa, from the perspectives of heat resistance and the meltability of the (U). The storage modulus $G'_{130}$ as used in the present invention is measured by the method described in Examples.

The Mn of the thermoplastic urethane urea resin (U) is preferably 10,000 to 40,000, more preferably 20,000 to 30,000. The Mn of the thermoplastic urethane urea resin (U) in the present invention is measured by the method described in Examples.

Examples of the method for producing the thermoplastic urethane urea resin (U) include the following methods.
(1) A method involving reacting a mixture of a polymeric diol (a), a linear alkane diol (b) and a monool (c) with an organic diisocyanate (e) in the presence or absence of an organic solvent so that the molar ratio of the hydroxy groups in the mixture to the isocyanate groups of the organic diisocyanate (e) may be from 1:1.2 to 1:4.0, and making a resulting urethane prepolymer (Up) having an isocyanate group at an end thereof undergo an extension reaction with a diamine (d) in the presence of water and a dispersion stabilizer. As a low molecular weight diamine, a blocked linear aliphatic diamine (for example, a ketimine compound), etc. can be used.
(2) A method involving making the urethane prepolymer (Up) undergo an extension reaction with a diamine (d) in the presence of a nonpolar organic solvent and a dispersion stabilizer.
(3) A method involving reacting a polymeric diol (a), a linear alkane diol (b), a monool (c), a diamine (d), and an organic diisocyanate (e) in one shot.

Examples of the organic solvent to be used for the production of the thermoplastic urethane urea resin (U) include ketones having 3 to 9 carbon atoms (acetone, methyl ethyl ketone, methyl isobutyl ketone, diethyl ketone, etc.), ethers having 4 to 8 carbon atoms (tetrahydrofuran, etc.), and esters having 3 to 6 carbon atoms (methyl acetate, ethyl acetate, etc.). Organic solvents may be used singly or alternatively may be used in a combination of two or more species thereof.

Examples of the dispersion stabilizer to be used for the production of the thermoplastic urethane urea resin (U) include water-soluble polymers (e.g., methylcellulose, polyvinyl alcohol, polyethylene glycol, polyacrylic acid salts, polyvinyl pyrrolidone, and Na salts of a copolymer of diisobutylene and maleic acid), inorganic powders (e.g., a calcium carbonate powder, a calcium phosphate powder, a hydroxyapatite powder, and a silica powder), and surfactants (e.g., sodium dodecylbenzenesulfonate, and sodium laurylsulfate). Dispersion stabilizers may be used singly or alternatively may be used in a combination of two or more species thereof.

The reaction temperature in producing the urethane prepolymer (Up) may be the same temperature as that usually adopted for performing urethanization: when an organic solvent is used, the temperature is usually 20° C. to 100° C., and when no organic solvent is used, the temperature is usually 20° C. to 140° C., preferably 80° C. to 130° C.

In the urethanization reaction, a catalyst used ordinarily for polyurethane may, as required, be used in order to promote the reaction. Examples of the catalyst include amine-based catalysts (triethylamine, N-ethylmorpholine, triethylenediamine, etc.) and tin-based catalysts (trimethyltin laurate, dibutyltin dilaurate, dibutyltin malate, etc.).

Examples of a method of rendering the thermoplastic urethane urea resin (U) powdery include a method of obtaining a dispersion in which the (U) has been dispersed in water or a mixture of water and an organic solvent, and then removing the dispersion medium, and a method of obtaining a massive or pelletized (U) and then pulverizing it.

The method of obtaining the thermoplastic urethane urea resin (U) as a dispersion is not particularly limited, and examples thereof include the method of (1) in the method for producing the urethane urea resin (U) as described supra, and the methods disclosed in WO 2011/070784 A1 and WO 2013/018747 A1.

The emulsifying/dispersing apparatus to be used for the production of a dispersion of (U) is not particularly limited as long as it is one which is commonly marketed as an emulsifying apparatus or a disperser, and examples thereof include batch-type emulsifying apparatuses such as a homogenizer (manufactured by IKA Japan K.K.), Polytron (manufactured by Kinematica AG), and TK Auto Homomixer (manufactured by PRIMIX Corporation); continuous emulsifying apparatuses such as Ebara Milder (manufactured by Ebara Corporation), TK Fillmix and TK Pipe Line Homomixer (manufactured by PRIMIX Corporation), Colloid Mill (manufactured by Shinko Pantech Co., Ltd.), a slasher and Trigonal wet pulverizer (manufactured by NIPPON Coke & Engineering Co., Ltd.), Capitron (manufactured by Eurotech, Ltd.), and Fine Flow Mill (manufactured by Pacific Machinery & Engineering Co., Ltd.); high-pressure emulsifying apparatuses such as Microfluidizer (manufactured by Mizuho Kogyo Co., Ltd.), Nanomizer (manufactured by Nanomizer Inc.), and APV Gaulin (manufactured by Gaulin Co., Ltd.); membrane emulsifying apparatuses such as a membrane emulsifying apparatus (manufactured by REICA Co., Ltd.), vibration emulsifying apparatuses such as Vibro Mixer (manufactured by REICA Co., Ltd.), and ultrasonic emulsifying apparatuses such as an ultrasonic homogenizer (manufactured by BRANSON Co. Ltd.). Of these, preferred from the viewpoint of particle size distribution are APV Gaulin, a homogenizer, TK Auto Homomixer, Ebara Milder, TK Filmix, and TK Pipe Line Homomixer.

As the method for producing the massive or pelletized thermoplastic urethane urea resin (U), a batch type kneading machine such as a kneader, and a screw type extruder equipped with a side feeder can, for example, be used. Subsequently, a powdery thermoplastic urethane urea resin (U) can be obtained by cooling with liquid nitrogen, etc. and then pulverizing with an impact pulverizer such as a turbo mill.

The powdery thermoplastic urethane urea resin composition (P) in the present invention comprises the thermoplastic urethane urea resin (U) and an additive.

Examples of the additive include an inorganic filler, a pigment, a plasticizer, a releasing agent, a stabilizer, and a blocking inhibitor (powder flowability improver). Additives may be used singly or alternatively may be used in a combination of two or more species thereof.

Examples of the inorganic filler include kaolin, talc, silica, titanium oxide, calcium carbonate, bentonite, mica, sericite, glass flake, glass fiber, graphite, magnesium hydroxide, aluminum hydroxide, antimony trioxide, barium sulfate, zinc borate, alumina, magnesia, wollastonite, xonotlite, whisker, and a metal powder. Of these, preferred from the viewpoint of accelerating the crystallization of a thermoplastic resin are kaolin, talc, silica, titanium oxide, and calcium carbonate, and more preferred are kaolin and talc.

The volume average particle diameter of the inorganic filler is preferably 0.1 to 30 µm, more preferably 1 to 20 µm, particularly preferably 5 to 10 µm from the viewpoint of dispersibility thereof into a thermoplastic resin.

The amount of the inorganic filler to be added is preferably 0 to 40% by weight, more preferably 1 to 20% by weight relative to the weight of the thermoplastic urethane urea resin (U).

The pigment is not particularly limited and known organic pigments and inorganic pigments can be used. Examples of the organic pigment include insoluble or soluble azo pigments, copper phthalocyanine-based pigments, and quinacridone-based pigments, and examples of the inorganic pigment include chromic acid salts, ferrocyanides, metal oxides (titanium oxide, iron oxide, zinc oxide, aluminum oxide, etc.), metal salts [sulfates (barium sulfate, etc.), silicates (calcium silicate, magnesium silicate, etc.), carbonates (calcium carbonate, magnesium carbonate, etc.), phosphates (calcium phosphate, magnesium phosphate, etc.), etc.], metal powders (aluminum powder, iron powder, nickel powder, copper powder, etc.), and carbon black. The average particle diameter of the pigment, which is not particularly limited, is usually 0.2 to 5.0 µm, preferably 0.5 to 1 µm.

The amount of the pigment to be added is usually 10% by weight or less, preferably 0.01 to 5% by weight, more preferably 1 to 3% by weight based on the weight of the thermoplastic urethane urea resin (U).

Examples of the plasticizer include phthalic esters (dibutyl phthalate, dioctyl phthalate, dibutyl phthalate benzyl, diisodecyl phthalate, etc.); aliphatic dibasic acid esters (di-2-ethylhexyl adipate, 2-ethylhexyl sebacate, etc.); trimellitic acid esters (tri-2-ethylhexyltrimellitate, trioctyltrimellitate, etc.); fatty acid esters (butyl oleate, etc.); aliphatic phosphates (trimethyl phosphate, triethyl phosphate, tributyl phosphate, tri-2-ethylhexyl phosphate, tributoxy phosphate, etc.); aromatic phosphates [triphenyl phosphate, tricresyl phosphate, trixylenyl phosphate, cresyldiphenyl phosphate, xylenyldiphenyl phosphate, 2-ethylhexyldiphenyl phosphate, tris(2,6-dimethylphenyl) phosphate, etc.]; halogenated aliphatic phosphates [tris(chloroethyl) phosphate, tris (β-chloropropyl) phosphate, tris(dichloropropyl) phosphate, tris(tribromoneopentyl) phosphate, etc.]; and mixtures of two or more thereof.

The amount of the plasticizer to be added is preferably 0 to 50% by weight, more preferably 5 to 20% by weight based on the weight of the thermoplastic urethane urea resin (U).

Known releasing agents can be used as the releasing agent, and examples thereof include fluorine compound type releasing agents [triperfluoroalkyl (having 8 to 20 carbon atoms) phosphates (triperfluorooctyl phosphate, triperfluorododecyl phosphate, etc.)]; silicone compound type releasing agents (dimethylpolysiloxane, amino-modified dimethylpolysiloxane, carboxyl-modified dimethylpolysiloxane, etc.); fatty acid ester type releasing agents [monohydric or polyhydric alcohol esters of a fatty acid having 10 to 24 carbon atoms (e.g., butyl stearate, hardened castor oil, and ethylene glycol monostearate), etc.]; aliphatic acid amide type releasing agents [mono or bisamides of an aliphatic acid having 8 to 24 carbon atoms (e.g., oleic amide, palmitic amide, stearic amide, and distearic amide of ethylenediamine), etc.]; metal soaps (magnesium stearate, zinc stearate, etc.); natural or synthetic waxes (paraffin wax, microcrystalline wax, polyethylene wax, polypropylene wax, etc.); and mixtures of two or more thereof.

The amount of the releasing agent to be added is preferably 0 to 1% by weight, more preferably 0.1 to 0.5% by weight based on the weight of the thermoplastic urethane urea resin (U).

Besides ordinary ultraviolet absorbers and antioxidants used for materials for slush molding, there can be used, as the stabilizer, for example, a compound having a carbon-carbon double bond (an ethylene bond, etc. optionally having a substituent) (excluding double bonds in an aromatic ring) or a carbon-carbon triple bond (an acetylene bond optionally having a substituent) in the molecule thereof.

Examples of the UV absorber include benzophenone-based UV absorbers [2,4-dihydroxybenzophenone, 2-hydroxy-4-methoxybenzophenone, etc.]; benzotriazole-based UV absorbers [2-(2'-hydroxy-5'-methylphenyl)benzotriazole, etc.]; salicylic acid-based UV absorbers [phenyl salicylate, etc.]; and hindered amine-based UV absorbers [bis(2, 2,6,6-tetramethyl-4-piperidyl) sebacate, etc.].

Examples of the antioxidant include phenol-based antioxidants [2,6-di-tert-butyl-p-cresol, butylated hydroxyanisole, etc.]; bisphenol-based antioxidants [2,2'-methylenebis (4-methyl-6-tert-butylphenol), etc.]; and phosphorus-containing antioxidants [triphenyl phosphite, diphenyl isodecyl phosphite, etc.].

Examples of the compound having a carbon-carbon double bond or a carbon-carbon triple bond in the molecule thereof include esters of (meth)acrylic acid with 2- to 10-valent polyhydric alcohols (2 to 10 valent polyhydric alcohols; the same applies hereinafter) [ethylene glycol di(meth)acrylate, trimethylolpropane tri(meth)acrylate, pentaerythritol tetra(meth)acrylate, dipentaerythritol tri(meth) acrylate, etc.]; esters of (meth)allyl alcohol with 2- to 6-basic polybasic carboxylic acids [diallyl phthalate, triallyl trimellitate, etc.]; poly(meth)allyl ethers of polyhydric alcohols [pentaerythritol (meth)allyl ether, etc.]; polyvinyl ethers of polyhydric alcohols (ethylene glycol divinyl ether, etc.); polypropenyl ethers of polyhydric alcohols (ethylene glycol dipropenyl ether, etc.); polyvinylbenzenes (divinylbenzene, etc.), and mixtures of two or more thereof. Of these, esters of (meth) acrylic acid with polyhydric alcohols are preferable, and trimethylolpropane tri(meth)acrylate, pentaerythritol tetra(meth)acrylate, and dipentaerythritol penta(meth)acrylate are more preferable from the viewpoint of stability (radical polymerization rate).

The amount of the stabilizer to be added is preferably 0 to 20% by weight, more preferably 1 to 15% by weight based on the weight of the thermoplastic urethane urea resin (U).

As the blocking inhibitor (powder flowability improver), known inorganic blocking inhibitors, known organic blocking inhibitors, etc. can be used. Examples of the inorganic blocking inhibitor include silica, talc, titanium oxide, and calcium carbonate. Examples of the organic blocking inhibitor include thermosetting resins (such as thermosetting polyurethane resins, guanamine-based resins, and epoxy resins) having a particle diameter of 10 μm or less, and thermoplastic resins [e.g., thermoplastic polyurethane urea resins, and poly(meth)acrylic resins] having a particle diameter of 10 μm or less.

The amount of the blocking inhibitor (powder flowability improver) to be added is preferably 0 to 5% by weight, more preferably 0.5 to 1% by weight based on the weight of the thermoplastic urethane urea resin (U).

The total of the amounts of the additives to be added is preferably 0.01 to 50% by weight, more preferably 1 to 30% by weight based on the weight of the thermoplastic urethane urea resin (U).

While the additive may be added into a feedstock before the production of the thermoplastic urethane urea resin (U) or at any stage selected from during the production of the urethane prepolymer (Up), after the production of the urethane prepolymer (Up), and after the production of the thermoplastic urethane urea resin (U), it is preferable to add the additive after the production of the thermoplastic urethane urea resin (U) when the additive is a plasticizer, a releasing agent, or a blocking inhibitor (powder flowability improver).

When the additive is a liquefied material, the additive is allowed to soak into a thermoplastic urethane urea resin (U) by mixing the additive with the (U), so that a powdery thermoplastic urethane urea resin composition (P) in which the (U) has been impregnated with the additive is obtained.

As the mixing apparatus to be used in the case of mixing with additives after obtaining the thermoplastic urethane urea resin (U), a known powder mixing apparatus can be used, and any of a container rotation type mixer, a fixed-container type mixer, and a fluid moving type mixer can be used. For example, examples of the fixed-container type mixers include high-speed flowing type mixers, biaxial paddle type mixers, high-speed shearing mixing apparatuses [Henschel Mixer (registered trademark), etc.], low-speed mixing apparatuses (a planetary mixer, etc.), and cone-shaped screw mixers [Nauta Mixer (registered trademark; this note is omitted hereinafter), etc.], and preferred of these are biaxial paddle type mixers, low-speed mixing apparatuses (a planetary mixer, etc.), and cone-shaped screw mixers (Nauta Mixer, etc.).

The tensile strength at 25° C. of a molded film of the powdery thermoplastic urethane urea resin composition (P) in the present invention is usually 8.0 MPa or more, preferably 9.0 MPa or more. If the tensile strength is 8.0 MPa or more, tear of a skin or the like does not occur during handling of the skin. The tensile strength in the present invention is measured by the method described in Examples.

The storage modulus $G'_{130}$ of the (P) measured after a lapse of 1 hour at 130° C. when the (P) is melted at 200° C. and then cooled to 130° C. at a cooling rate of 35° C./minute is usually 0.1 to 5.0 MPa, preferably 0.2 to 1.0 MPa.

If the storage modulus $G'_{130}$ is 0.1 MPa or more, heat resistance is good, and if it is 5.0 MPa or less, the low temperature meltability of the thermoplastic urethane urea resin composition (P) is good. The storage modulus $G'_{130}$ in the present invention is measured by the method described in Examples.

The ratio of storage modulus G' represented by expression (1) of the powdery thermoplastic urethane urea resin composition (P) is usually 50% or more, preferably 60% or more. If the ratio of storage modulus G' is 50% or more, a skin does not deform and wrinkles do not appear during real stitching.

The ratio of storage modulus $G'$=storage modulus $G'_{50}$÷storage modulus $G'_{23}$×100 (1)

The storage modulus $G'_{50}$ in the expression (1) is a storage modulus G' at 50° C. when the (P) is melted at 200° C. and then is cooled to 40° C. at a cooling rate of 80° C./minute, and the storage modulus $G'_{23}$ is a storage modulus G' after the (P) being left at 23° C. for 1 hour after being cooled to 23° C. at a cooling rate of 35° C./minute after being melted at 200° C.

The storage moduli $G'_{50}$ and $G'_{23}$ in the present invention are measured by the method described in Examples.

The powdery thermoplastic urethane urea resin composition (P) in the present invention is particularly useful as a material for producing a resin molded article, such as a skin, by a slush molding method. One example of the slush molding method is a method of vibrating and rotating a box containing the powdery thermoplastic urethane urea resin composition (P) in the present invention together with a heated mold attached thereto to melt and fluidize the powder inside the mold, and cooling and then solidifying the composition to produce a skin.

The mold temperature is preferably 200 to 300° C., more preferably 200 to 250° C.

The thickness of a skin molded from the powdery thermoplastic urethane urea resin composition (P) is preferably 0.3 to 1.5 mm. The powdery thermoplastic urethane urea resin composition (P) can be molded in a relatively low temperature and the temperature for the molding can be 200 to 250° C.

The molded skin can be processed into a resin molded article by setting it to a foaming mold to bring the front surface thereof into contact with the mold, and then causing a urethane foam to flow thereinto, thereby forming a foamed layer having a thickness of 5 mm to 15 mm on the rear surface. A resin molded article formed from the powdery thermoplastic urethane urea resin composition (P) is used suitably as an automobile interior material, e.g., an instrument panel and a door trim.

EXAMPLES

Hereafter, the present invention will be described more specifically by way of examples, to which, however, the present invention is not limited. Hereafter, "part" means "part by weight" and "%" means "% by weight."

Production Example 1

[Production of Thermoplastic Urethane Urea Resin (U-1)]

A reaction vessel equipped with a thermometer, a stirrer, and a nitrogen inlet tube was charged with 282.9 parts of polyethylene isophthalate having an Mn of 2300 as the polyester polyol (a1), 424.4 parts of polybutylene adipate having an Mn of 1,000 as the polyester polyol (a2), 9.34 parts of benzyl alcohol as the monool (c), and 5.88 parts of 1,4-butanediol as the linear alkanediol (b), and after purging with nitrogen, they were heated to 110° C. under stirring to melt and then cooled down to 50° C. Subsequently, 150.0 parts of methyl ethyl ketone as an organic solvent and 132.0 parts of hexamethylene diisocyanate as the organic diisocyanate (e) were added and a reaction was performed at 90° C. for 6 hours. Then, after cooling down to 70° C., 1.4 parts of IRGANOX 1010 [produced by Ciba Specialty Chemicals] as a stabilizer was added and mixed uniformly, affording a solution of a urethane prepolymer (Up-1). The isocyanate group content of the resulting prepolymer solution was 1.63%. Subsequently, 157.9 parts of an aqueous solution prepared by dissolving 5.9 parts of SANSPEARL PS-8 produced by Sanyo Chemical Industries, Ltd. as a dispersion stabilizer in 152 parts of water and 37.1 parts of methyl ethyl ketone as an organic solvent were added to the reaction vessel, followed by uniformly stirring at 20° C., and then 1.7 parts of hexamethylenediamine as the diamine (d) was added under stirring at a peripheral speed of 23 m/s (revolution speed: 10,000 rpm) using an ULTRADISPERSER [manufactured by Yamato Scientific Co., Ltd.] and mixed for 1 minute. Subsequently, 103.3 parts of the prepolymer (Up-1) the temperature of which had been adjusted to 75° C. was charged and mixed at a peripheral speed of 23 m/s for 2 minutes, and then the mixture was transferred to a reaction vessel equipped with a thermometer, a stirrer and a nitrogen inlet tube, and after purging with nitrogen, the mixture was allowed to react at 50° C. for 10 hours under stirring. After the end of the reaction, separation by filtration and drying were performed, affording a thermoplastic urethane urea resin (U-1).

Production Examples 2 to 4 and Comparative Production Examples 1 to 5

[Production of Thermoplastic Urethane Urea Resins (U-2) to (U-4) and Comparative Thermoplastic Urethane Urea Resins (U'-1) to (U'-5)]

Thermoplastic urethane urea resins (U-2) to (U-4) and comparative thermoplastic urethane urea resins (U'-1) to (U'-5) were obtained in the same manner as in Example 1 except that the feedstock was changed to those shown in Table 1. It is noted that the linear alkane diol (b) was not used in Comparative Production Example 2.

The melt viscosities, the Mn, and the volume average particle diameters of (U-1) to (U-4) and (U'-1) to (U'-5) obtained in Production Examples 1 to 4 and Comparative Production Examples 1 to 5 are shown in Table 1. The methods of measuring physical properties are as follows.

<Method of Measuring Melt Viscosity at 190° C.>

The temperature was raised at a constant rate under the conditions described below and the melt viscosity of a thermoplastic urethane urea resin (U) at 190° C. was measured.

Instrument: Flowtester CFT-500 [manufactured by Shimadzu Corporation]

Load: 5 kg·f

Die: 0.5 mm in aperture diameter, 1.0 mm in length

Temperature ramp-up rate: 5° C./minute

<Method of Measuring Mn>

The Mn of a thermoplastic urethane urea resin (U) was measured under the following conditions using gel permeation chromatography.

Instrument: "HLC-8120" [manufactured by [Tosoh Corporation]

Column: "TSK GEL GMH6" [manufactured by Tosoh Corporation], two columns

Measurement temperature: 40° C.

Sample solution: 0.25% by weight solution in THF (tetrahydrofuran)

Amount of solution injected: 100 μl

Detecting device: refractive index detector

Standard substance: standard polystyrene (TSK standard POLYSTYRENE) 12 items (molecular weight: 500, 1,050, 2,800, 5,970, 9,100, 18,100, 37,900, 96,400, 190,000, 355,000, 1,090,000, 2,890,000) [produced by Tosoh Corporation] For the measurement of Mn, a material obtained by dissolving a sample in tetrahydrofuran and then removing insolubles with a glass filter was used as a sample solution.

<Method of Measuring Volume Average Particle Diameter>

Measurement was performed using a laser diffraction particle size distribution analyzer ["Microtrac M13000II" manufactured by Nikkiso Co., Ltd.], and a particle diameter at which the cumulative amount was 50% ($d_{50}$) in the resulting relative cumulative particle size distribution curve was defined as a volume average particle diameter.

TABLE 1

| | | | | Production Example | | | | Comparative Production Example | | | | |
|---|---|---|---|---|---|---|---|---|---|---|---|---|
| | | | | 1 | 2 | 3 | 4 | 1 | 2 | 3 | 4 | 5 |
| Code of urethane urea resin (U) | | | | (U-1) | (U-2) | (U-3) | (U-4) | (U'-1) | (U'-2) | (U'-3) | (U'-4) | (U'-5) |
| Code of solution of urethane prepolymer (Up) produced | | | | Solution of (Up-1) | Solution of (Up-2) | Solution of (Up-3) | Solution of (Up-4) | Solution of (Up'-1) | Solution of (Up'-2) | Solution of (Up'-3) | Solution of (Up'-4) | Solution of (Up'-5) |
| Feedstock of solution of urethane prepolymer (Up) (part) | Polymeric diol (a) | Polyester polyol (a1) | Polyethylene isophthalate diol (Mn = 2,300) | 282.9 | 280.2 | 282.9 | 280.2 | 282.9 | 282.9 | 282.9 | 280.2 | 280.2 |
| | | Polyester polyol (a2) | Polybutylene adipate diol (Mn = 1,000) | 424.4 | 420.3 | 424.4 | 420.3 | 424.4 | 424.4 | 424.4 | 420.3 | 420.3 |
| | Linear alkane diol (b) | | 1,4-Butanediol | 5.88 | — | 3.87 | — | 17.60 | — | 11.80 | 23.10 | — |
| | | | 1,6-Hexanediol | — | 7.70 | — | 3.90 | — | — | — | — | 15.40 |

TABLE 1-continued

|  |  |  | Production Example | | | | Comparative Production Example | | | | |
| --- | --- | --- | --- | --- | --- | --- | --- | --- | --- | --- | --- |
|  |  |  | 1 | 2 | 3 | 4 | 1 | 2 | 3 | 4 | 5 |
|  | Monool (c) | Benzyl alcohol | 9.34 | 9.25 | 9.34 | 9.25 | 9.34 | 9.34 | 9.34 | 9.25 | 9.25 |
|  | Organic diisocyanate (e) | Hexamethylene diisocyanate | 132.0 | 138.9 | 132.0 | 138.9 | 132.0 | 132.0 | 132.0 | 138.9 | 138.9 |
|  | Stabilizer | IRGANOX 1010 | 1.4 | 1.4 | 1.4 | 1.4 | 1.4 | 1.4 | 1.4 | 1.4 | 1.4 |
|  | Organic solvent | Methyl ethyl ketone | 150.0 | 150.0 | 150.0 | 150.0 | 150.0 | 150.0 | 150.0 | 150.0 | 150.0 |
| Feedstock of urethane urea resin (U) (part) | Solution of urethane prepolymer (Up) | Kind | Solution of (Up-1) | Solution of (Up-2) | Solution of (Up-3) | Solution of (Up-4) | Solution of (Up'-1) | Solution of (Up'-2) | Solution of (Up'-3) | Solution of (Up'-4) | Solution of (Up'-5) |
|  |  | Used amount | 103.3 | 103.3 | 103.3 | 103.3 | 103.3 | 103.3 | 103.3 | 103.3 | 103.3 |
|  | Diamine (d) | Hexamethyl-enediamine | 1.7 | 1.7 | 1.7 | 1.7 | 1.7 | 1.7 | 1.7 | 1.7 | 1.7 |
|  | Dispersion stabilizer | SANSPEARL PS-8 | 5.9 | 5.9 | 5.9 | 5.9 | 5.9 | 5.9 | 5.9 | 5.9 | 5.9 |
|  | Water |  | 152 | 152 | 152 | 152 | 152 | 152 | 152 | 152 | 152 |
|  | Organic solvent | Methyl ethyl ketone | 37.1 | 37.1 | 37.1 | 37.1 | 37.1 | 37.1 | 37.1 | 37.1 | 37.1 |
| Ratio of the weight of (b) to the total weight of (a), (b), (c), (d) and (e) |  | % | 0.7 | 0.9 | 0.4 | 0.4 | 2.0 | 0.0 | 1.3 | 2.6 | 1.7 |
| Weight ratio of (a1) to (a2) [(a1):(a2)] |  |  | 20:80 | 20:80 | 20:80 | 20:80 | 20:80 | 20:80 | 20:80 | 20:80 | 20:80 |
| Physical property of urethane urea resin (U) | Melt viscosity (190° C.) | Pa · s | 420 | 400 | 380 | 350 | 600 | 250 | 500 | 800 | 550 |
|  | Mn | — | 25,000 | 24,000 | 24,000 | 25,000 | 25,000 | 24,000 | 23,000 | 25,000 | 25,000 |
|  | Volume average particle diameter | μm | 172 | 170 | 169 | 171 | 171 | 170 | 169 | 169 | 168 |

Production Example 5

[Production of Thermoplastic Urethane Urea Resin Composition (P-1)]

Into a Nauta mixer were charged 100 parts of thermoplastic urethane urea resin (U-1), 12 parts of polyethylene glycol-dibenzoate [produced by Sanyo Chemical Industries, Ltd.; SANFLEX EB-300] as a plasticizer, 1.0 part of dipentaerythritol pentaacrylate [produced by Sanyo Chemical Industries, Ltd.; NEOMER DA-600], which is a compound having a carbon-carbon double bond in its molecule, as a stabilizer, 0.3 parts of bis(1,2,2,6,6-pentamethyl-4-piperidyl)sebacate and methyl 1,2,2,6,6-pentamethyl-4-piperidyl sebacate (mixture) [trade name: TINUVIN 765, produced by BASF Japan Ltd.] as a UV absorber, and 1 part of carbon black as a pigment, and then were allowed to impregnate at 70° C. for 4 hours. Subsequently, 0.06 parts of dimethylpolysiloxane [produced by Nippon Unicar Co., Ltd., L45-1000] as an internal releasing agent was charged and mixed for 1 hour and then cooled to room temperature. Finally, a thermoplastic urethane urea resin composition (P-1) was obtained by charging and mixing 0.5 parts of crosslinked polymethyl methacrylate [Ganz Chemical Co., Ltd.; GANZPEARL PM-030S] as a blocking inhibitor.

Production Examples 6 to 8 and Comparative Production Examples 6 to 10

[Production of Thermoplastic Urethane Urea Resin Compositions (P-2) to (P-4) and Comparative Thermoplastic Urethane Urea Resin Compositions (P'-1) to (P'-5)]

Thermoplastic urethane urea resin compositions (P-2) to (P-4) and comparative thermoplastic urethane urea resin compositions (P'-1) to (P'-5) were obtained in the same manner as in Example 1 except that the thermoplastic urethane urea resin (U-1) was changed to those shown in Table 2.

The volume average particle diameters and the storage moduli G' measured by the following method of the thermoplastic urethane urea resin compositions (P-1) to (P-4) and (P'-1) to (P'-5) obtained are shown in Table 2.

<Method of Measuring Storage Modulus G'>

Storage modulus G' under respective conditions was measured under the following conditions.

Instrument: dynamic viscoelasticity analyzer "RDS-2" (manufactured by Rheometric Scientific)

Frequency: 1 Hz (1) Method of Measuring $G'_{130}$: Storage Modulus at 130° C.

A sample to be measured was set to a jig of the analyzer (the diameter of the jig: 8 mm), and then the temperature was raised to 200° C. to melt the sample at 200° C. for 1 minute, thereby bringing the sample into firm contact with the jig, and then the sample was cooled to 130° C. at a cooling rate of 35° C./minute and the measurement was started, and a storage modulus G' after a lapse of 1 hour at 130° C. was read.

(2) Method of Measuring $G'_{50}$: Storage Modulus at 50° C.

A sample to be measured was set to a jig of the analyzer (the diameter of the jig: 8 mm) and then the temperature was raised to 200° C. to melt the sample at 200° C. for 1 minute, thereby bringing the sample into firm contact with the jig, and then the measurement was started and the sample was cooled to 40° C. at a cooling rate of 80° C./minute, thereby obtaining a curve graph in which storage modulus G' was plotted against temperature, and a storage modulus G' at 50° C. was read from the graph.

(3) Method of Measuring $G'_{23}$: Storage Modulus at 23° C.

A sample to be measured was set to a jig of the analyzer (the diameter of the jig: 8 mm), and then the temperature was raised to 200° C. to melt the sample at 200° C. for 1 minute, thereby bringing the sample into firm contact with the jig, and then the sample was cooled to 23° C. at a cooling rate of 35° C./minute and the measurement was started, and a storage modulus G' after a lapse of 1 hour at 23° C. was read.

TABLE 2

| | | Production Example | | | | Comparative Production Example | | | | |
|---|---|---|---|---|---|---|---|---|---|---|
| | | 5 | 6 | 7 | 8 | 6 | 7 | 8 | 9 | 10 |
| Code of urethane urea resin composition (P) | | (P-1) | (P-2) | (P-3) | (P-4) | (P'-1) | (P'-2) | (P'-3) | (P'-4) | (P'-5) |
| Kind of urethane urea resin (U) used | | (U-1) | (U-2) | (U-3) | (U-4) | (U'-1) | (U'-2) | (U'-3) | (U'-4) | (U'-5) |
| Physical property value | Volume average particle diameter (μm) | 170 | 175 | 174 | 176 | 176 | 176 | 177 | 175 | 174 |
| | Storage modulus at 130° C. $G'_{130}$ MPa | 0.15 | 0.13 | 0.12 | 0.10 | 0.30 | 0.02 | 0.20 | 0.30 | 0.20 |
| | Ratio of storage modulus G' % | 53 | 59 | 62 | 65 | 15 | 69 | 35 | 17 | 38 |

Examples 1 to 4 and Comparative Examples 1 to 5

[Preparation and Evaluation of a Skin as a Molded Article]

Skins were obtained by performing slush molding by the method described below using the thermoplastic urethane urea resin compositions (P-1) to (P-4) and (P'-1) to (P'-5) obtained in Production Examples 5 to 8 and Comparative Production Examples 6 to 10, and then respective physical properties were measured or evaluated by the methods described below. The results are shown in Table 3.

<Preparation of Skin>

A thermoplastic urethane urea resin composition was charged into a grain-patterned Ni electrocast mold that had beforehand been heated to 210° C., and after holding it for 10 seconds, excess thermoplastic urethane urea resin composition was discharged and the mold was water-cooled for 60 seconds, and thus a 1.0 mm-thick molded skin was produced. In addition, a 0.5 mm-thick molded skin was produced in the same manner as above except that the holding time after the charging was changed to 6 seconds.

<Method of Measuring Tensile Strength and Elongation at Break>

Measurement was performed in accordance with JIS K 6251:2010. Specifically, from each of a 0.5 mm-thick molded skin and a 1.0 mm-thick molded skin, three tensile test specimens of the dumbbell No. 1 type form of JIS K6251:2010 were punched out, and marking lines were drawn at intervals of 40 mm on the center of each specimen. The minimum value of thickness taken at five positions located between marked lines was adopted as the thickness of a specimen. Each of the specimens was attached to an autograph under a 25° C. atmosphere and was pulled at a rate of 200 mm/min. The tensile strength and the elongation at break were measured.

<Rear Surface Meltability>

For each of a 0.5 mm-thick molded skin and a 1.0 mm-thick molded skin, the center of the rear surface of the molded skin was observed visually and the meltability was evaluated according to the following criteria.

5: The surface is even and glossy.
4: There is some unmelted powder, but the surface is glossy.
3: There are irregularities on the overall rear surface, and the surface is glossless. There is no pinhole penetrating to the front surface.
2: There are irregularities of the shape of powder on the overall rear surface, and there are pinholes penetrating to the front surface.
1: The powder is not melted and is not able to be processed into a molded article.

<Tear Strength on Hygrothermal Aging Test>

A 1.0 mm-thick molded skin was left at rest for 400 hours in a thermo-hygrostat set at a temperature of 80° C. and a humidity of 95% RH, and then the tear strength of the skin was measured in accordance with JIS K6252:2007 and was compared with the initial strength. For the measurement of tear strength, three notch-free angle type specimens of JIS K 6252:2007 were punched out and the minimum of values of thickness measured at five points near a cut part was taken as the thickness of a specimen. Each of the specimens was attached to an autograph under a 25° C. atmosphere and was pulled at a rate of 200 mm/minute, and the tear strength was measured.

<Crease Angle in the Case when Folded 1.5 Minutes after the Release of Skin>

A 0.5 mm-thick molded skin and a 1.0 mm-thick molded skin are cut into a size of 4 cm by 2.5 cm, and each of the samples is folded in half 1.5 minutes after the release from a mold, and a load of 700 g·f is applied for 30 seconds. Ten minutes after removing the load, the angle at which the sample was folded was measured.

<Fusion Test after Heat Aging>

A 1.0 mm-thick molded skin was cut into a size being 60 mm in length and 95 mm in width, and a cut being 0.4 to 0.6 mm in depth at approximately right angle to the front surface and 60 mm in length was formed on the rear surface of the sheet with a cold cutter (the thickness of the blade: 0.3 mm). The molded skin was sandwiched between release sheets and an iron plate weighing 95 to 100 g and having dimensions (length, width, and height) being 100 mm in length, 100 mm in width, and 1.2 mm in thickness was placed on the release sheets such that the release sheets might be fully covered, and after they were left at rest for 100 hours in the air under normal pressure at 130° C., whether the cut of the sheet had been welded or not was observed visually.

Evaluation was performed according to the following criteria.

○: The cut formed with a cutter has not been welded at all.
Δ: The cut formed with a cutter has partly been welded.
x: The cut formed with a cutter has been welded.

TABLE 3

|  |  |  | Example | | | | Comparative Example | | | | |
| --- | --- | --- | --- | --- | --- | --- | --- | --- | --- | --- | --- |
|  |  |  | 1 | 2 | 3 | 4 | 1 | 2 | 3 | 4 | 5 |
| Code of urethane urea resin composition (P) used |  |  | (P-1) | (P-2) | (P-3) | (P-4) | (P'-1) | (P'-2) | (P'-3) | (P'-4) | (P'-5) |
| Evaluation result | Tensile strength (25° C.) | Skin thickness: 0.5 mm | MPa | 9.8 | 9.5 | 9.4 | 9.3 | 10.8 | 5.3 | 10.2 | 12.7 | 11.7 |
|  |  | Skin thickness: 1.0 mm | MPa | 9.5 | 9.2 | 9.0 | 8.9 | 10.5 | 4.9 | 9.7 | 12.5 | 11.3 |
|  | Elongation at break (25° C.) | Skin thickness: 0.5 mm | % | 590 | 560 | 520 | 580 | 660 | 420 | 630 | 630 | 620 |
|  |  | Skin thickness: 1.0 mm | % | 580 | 550 | 500 | 550 | 650 | 400 | 620 | 630 | 600 |
|  | Rear surface meltability (25° C.) | Skin thickness: 0.5 mm | — | 5 | 5 | 5 | 5 | 5 | 5 | 5 | 4 | 5 |
|  |  | Skin thickness: 1.0 mm | — | 5 | 5 | 5 | 5 | 4 | 5 | 4 | 3 | 4 |
|  | Tear strength on hygrothermal aging test (skin thickness: 1.0 mm) | Before test | kN/m | 66 | 65 | 60 | 62 | 75 | 56 | 70 | 79 | 77 |
|  |  | After test | kN/m | 62 | 61 | 55 | 56 | 70 | 50 | 66 | 72 | 73 |
|  | Crease angle in the case when folded 1.5 minutes after the release of skin | Skin thickness: 0.5 mm | ° | 7 | 7 | 6 | 6 | 30 | 4 | 16 | 37 | 28 |
|  |  | Skin thickness: 1.0 mm | ° | 7 | 7 | 6 | 6 | 30 | 4 | 16 | 37 | 28 |
|  | Fusion test after heat aging | Skin thickness: 1.0 mm | — | ○ | ○ | ○ | ○ | ○ | x | ○ | ○ | ○ |

It was shown that the molded articles of Examples 1 to 4 were useful as materials for automobile interior because they were superior in tensile strength and generated no creases.

INDUSTRIAL APPLICABILITY

A resin molded article for automobile interior materials obtained by slush-molding a powdery thermoplastic urethane urea resin composition (P) of the present invention is used suitably as a skin of an automobile interior material (an instrument panel, a door trim, etc.).

The invention claimed is:

1. A resin molded article for automobile interior materials, the resin molded article being obtained by slush molding a powdery thermoplastic urethane urea resin composition (P) that satisfies the following (1) through (5), said resin composition containing an additive and a thermoplastic urethane urea resin (U) obtained by reacting a polymeric diol having a number average molecular weight of 500 to 5,000 (a), a linear alkane diol having 4 to 6 carbon atoms (b), a monool (c), a diamine having 6 to 10 carbon atoms (d), and an organic diisocyanate (e):

(1) the polymeric diol (a) comprises a polyester diol (a1) obtained by reacting an aromatic dicarboxylic acid having 8 to 12 carbon atoms (f1) with ethylene glycol and a polyester diol (a2) obtained by reacting an aliphatic dicarboxylic acid having 4 to 15 carbon atoms (f2) with an aliphatic diol having 2 to 6 carbon atoms (g);

(2) the ratio of the weight of the (b) to the total weight of the (a), the (b), the (c), the (d) and the (e) is 0.4 to 1.0% by weight;

(3) the tensile strength at 25° C. of a formed film of the (P) is 8.0 MPa or more;

(4) the storage modulus $G'_{130}$ of the (P) measured after the (P) being left at 130° C. for 1 hour when the (P) is cooled to 130° C. at a cooling rate of 35° C./minute after being melted at 200° C. is 0.1 to 5.0 MPa;

(5) the ratio of storage modulus G' represented by formula (1) is 50% or more;

$$\text{the ratio of storage modulus } G' = G'_{50} \div G'_{23} \times 100 \quad (1)$$

wherein $G'_{50}$ is the storage modulus G' of the (P) measured at 50° C. when the (P) is melted at 200° C. and then is cooled to 40° C. at a cooling rate of 80° C./minute, and $G'_{23}$ is the storage modulus G' of the (P) measured after the (P) being left at 23° C. for 1 hour when the (P) is cooled to 23° C. at a cooling rate of 35° C./minute after being melted at 200° C.

2. The resin molded article according to claim 1, wherein the linear alkane diol having 4 to 6 carbon atoms (b) is 1,4-butanediol and/or 1,6-hexanediol.

3. The resin molded article according to claim 1, wherein the number average molecular weight of the polyester diol (a1) is 1,500 to 3,000 and the number average molecular weight of the polyester diol (a2) is 800 to 1,500.

4. The resin molded article according to claim 1, wherein the weight ratio of the polyester diol (a1) to the polyester diol (a2) [(a1):(a2)] is from 5:95 to 30:70.

5. The resin molded article according to claim 1, wherein the melt viscosity at 190° C. of the thermoplastic urethane urea resin (U) is 300 to 1,000 Pa·s.

* * * * *